United States Patent
Baratakke et al.

(10) Patent No.: US 8,265,079 B2
(45) Date of Patent: Sep. 11, 2012

(54) DISCRIMINATORY MTU FRAGMENTATION IN A LOGICAL PARTITION

(75) Inventors: Kavitha V. M. Baratakke, Austin, TX (US); Nikhil Hegde, Round Rock, TX (US); Rashmi Narasimhan, Roundrock, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/356,006

(22) Filed: Jan. 19, 2009

(65) Prior Publication Data

US 2010/0183009 A1 Jul. 22, 2010

(51) Int. Cl.
*H04L 12/56* (2006.01)
(52) U.S. Cl. .................................................. 370/392
(58) Field of Classification Search .................. None
See application file for complete search history.

(56) References Cited

U.S. PATENT DOCUMENTS

| | | | |
|---|---|---|---|
| 2003/0039249 A1* | 2/2003 | Basso et al. | 370/394 |
| 2004/0205231 A1* | 10/2004 | Clarke et al. | 709/237 |
| 2005/0216696 A1* | 9/2005 | Kawaguchi | 711/206 |
| 2005/0228896 A1* | 10/2005 | Nishida | 709/230 |
| 2006/0018315 A1* | 1/2006 | Baratakke et al. | 370/389 |
| 2006/0123204 A1* | 6/2006 | Brown et al. | 711/153 |
| 2008/0184224 A1* | 7/2008 | Das et al. | 718/1 |

* cited by examiner

*Primary Examiner* — Yong Zhou
(74) *Attorney, Agent, or Firm* — DeLizio Gilliam, PLLC

(57) ABSTRACT

Communication between nodes on distinct physical computer systems typically involves fragmentation of packets, such that packet size complies with a communication protocol's specified maximum transmission unit (MTU). However, communications between logical partitions on the same computer system ("virtual nodes") do not have to comply with a MTU. A computer system can handle packet sizes for intra-system communications between virtual nodes larger than the MTU. Functionality can be implemented to determine that a packet's source and destination are virtual nodes on the same physical machine. This can enable the system to virtually transfer packets for intra-system communication without fragmentation.

5 Claims, 4 Drawing Sheets

DISCRIMINATORY MTU FRAGMENTATION IN A LOGICAL PARTITION

BACKGROUND

Embodiments of the inventive subject matter generally relate to the field of computer networks, and more particularly, to discriminatory MTU fragmentation in a logical partition.

A virtual input/output (VIO) environment allows multiple VIO client logical partitions to communicate among themselves via a hypervisor and with nodes (physical computer systems, logical partitions on another computer system, etc.) external to the VIO environment via a Shared Ethernet Adapter (SEA). Such communication typically involves fragmentation of packets, such that packet size complies with a communication protocol's specified maximum transmission unit. Most VIO environments aim to maximize traffic within the VIO environment (i.e., between the client logical partitions) and minimize the traffic with nodes outside the VIO environment.

SUMMARY

Embodiments include a method comprising receiving an address of a destination and data to be transmitted to the destination. The data to be transmitted is generated by an application on a first logical partition on a computer system. A range of addresses that may be assigned to a plurality of logical partitions on the computer system is determined. It is determined that the destination address if one of the addresses in the determined range of addresses. The data is transmitted to the destination in accordance with an intra-system maximum transmission unit that indicates a maximum data size for transmission within the computer system. The intra-system maximum transmission unit is different from an inter-system maximum transmission unit that indicates a maximum data size for a transmission from the computer system to another computer system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Ethernet networking protocols, embodiments can use other networking and communication protocols (e.g., SONET, IEEE 802.11, IEEE 802.16, etc). In some instances, well-known instruction instances, protocols, structures, and techniques have not been shown in detail in order not to obfuscate the description.

Although communication network standards/protocols define a maximum size of a packet that can be transmitted along a communication network (maximum transmission unit (MTU)), communications between logical partitions on the same computer system ("virtual nodes") do not have to comply with the MTU. Typically, a computer system can handle packet sizes for intra-system communications between virtual nodes larger than the MTU. With the knowledge that a packet's source and destination are virtual nodes on the same physical machine, virtual nodes can avoid fragmentation in intra-system communications. After a system determines that a communication is between local virtual nodes, the system can virtually transfer packets for the communication without fragmentation, or fragment in accordance with buffer sizes of the computer system. Preventing fragmentation of packets that do not leave the physical computer system can improve performance, reduce the load on a Shared Ethernet Adapter (SEA), and prevent bottlenecks at the SEA.

Figure 1:
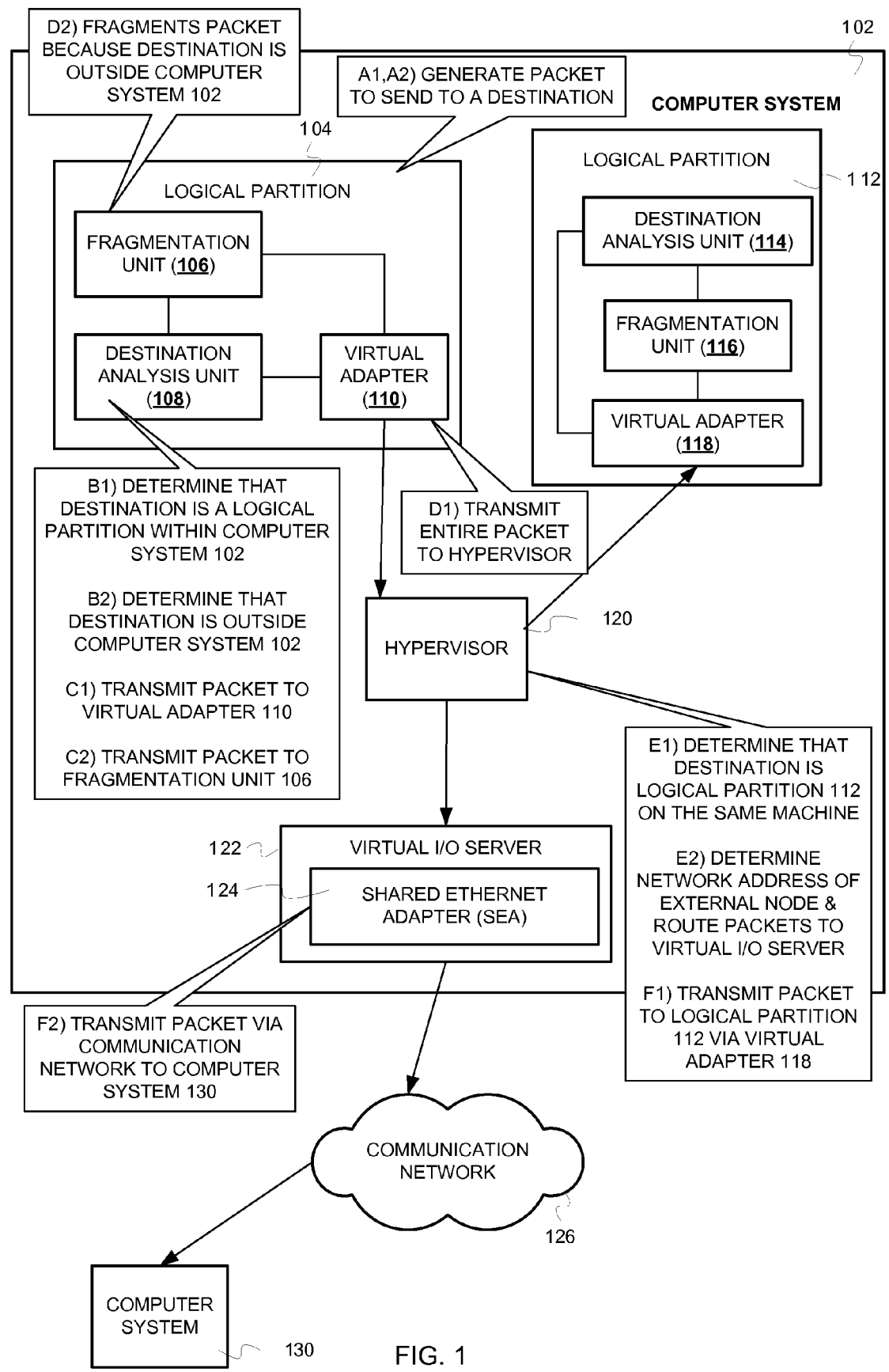
FIG. 1 is a conceptual diagram illustrating discriminatory packet fragmentation based on a packet's destination.

FIG. 1 is a conceptual diagram illustrating discriminatory packet fragmentation based on a packet's destination. FIG. 1 depicts two computer systems—a computer system 102 and a computer system 130. The computer system 102 comprises two logical partitions—a logical partition 104 and a logical partition 112. The logical partition 104 comprises a fragmentation unit 106 coupled with a destination analysis unit 108 and a virtual adapter 110. The destination analysis unit 108 is further coupled with the virtual adapter 110. Likewise, the logical partition 112 comprises a fragmentation unit 116 coupled with a destination analysis unit 114 and a virtual adapter 118. The destination analysis unit 114 is further coupled with the virtual adapter 118. The virtual adapters 110 and 118 communicate with a hypervisor 120, which in turn is coupled with a virtual I/O server 122. The virtual I/O server 122 comprises a Shared Ethernet Adapter (SEA) 124. The computer system 102 communicates with computer system 130 via a communication network 126.

At stage A1, an application running within the logical partition 104 creates a first packet to send to a destination. The size of the packet generated by the application is variable and is typically larger than the size of a packet that can be transmitted along the communication network 126 The logical partition can be a subset of a computer system's resources virtualized as a separate computer system with a separate (or shared) operating system. At stage B1, the destination analysis unit 108 determines a range of hardware addresses that can be assigned to the logical partitions on the computer system 102 and determines whether the packet's destination hardware address is one of the addresses within the determined range of hardware addresses. The range of hardware addresses may be determined by means of an algorithm that uses the computer system's serial number. In another implementation, the range of hardware addresses may be pre-determined and "known" to each logical partition. In another implementation, one or more arithmetic operations, logic operations, and/or bit masking operations may be performed on the destination hardware address to determine whether the packet's source and destination are on the same physical machine. In the example of FIG. 1, the logical partition 112 is the packet's destination. The destination analysis unit 108 determines that the packet's destination is on the same physical machine (i.e., the computer system 102). Therefore, at stage C1, the destination analysis unit 108 transmits the packet, without fragmenting, to the virtual adapter 110. If the size of the packet is greater than an intra-system MTU, the destination analysis unit 108 may direct the fragmentation unit 106 to fragment the packet in accordance with the intra-system MTU. The intra-system MTU may indicate a maximum data size for transmission between logical partitions within the same computer system. Virtual adapters allow connections (i.e., transfer of data) between logical partitions without the use of physical hardware (e.g., physical Ethernet adapter). Each logical partition may be associated with a distinct virtual adapter.

However, the destination analysis unit 108 need not be coupled with the virtual adapter 110. In such case, after the destination analysis unit 108 determines that the packet's destination is on the same physical machine (i.e., the computer system 102), the destination analysis unit 108 can encapsulate the packet and set a flag in the encapsulation. The flag can indicate that the fragmentation unit 106 should transmit the packet, without any fragmentation, to the virtual adapter 110.

At stage D1, the virtual adapter 110 transmits the entire packet to the hypervisor 120. The hypervisor 120 is a virtual machine manager that allows multiple operating systems to share a host processor's resources. In FIG. 1, hypervisor 120 allows the logical partitions 104 and 112, and the VIO server 122 to share resources of the computer system 102 (e.g., processor, memory, network interface, etc.). The hypervisor 120 controls the computer system's 102 processor and resources, and allocates the resources to each of the logical partitions based on their requirements. At stage E1, the hypervisor 120 determines that the packet should be transmitted to the logical partition 112. The hypervisor 120 also determines that the logical partition 112 resides on the computer system 102. At stage F1, the hypervisor 120 transmits the packet to the logical partition 112 via the virtual adapter 118.

At stage A2, the application running within the logical partition 104 creates a second packet to send to a destination. At stage B2, the destination analysis unit 108 determines a range of hardware addresses that can be assigned to the logical partitions on the computer system 102 and determines whether the packet's destination hardware address is one of the addresses within the determined range of hardware addresses. At stage B2, the destination analysis unit 108 also determines that the packet's destination hardware address does not lie within the determined range of addresses. Therefore, the destination analysis unit 108 determines that the packet's destination lies outside the computer system 102. At stage C2, the destination analysis unit 108 transmits the packet to the fragmentation unit 106 for fragmentation. However, the destination analysis unit 108 need not be coupled with the virtual adapter 110. Therefore, after the destination analysis unit 108 determines that the packet's destination is on another physical machine (e.g., the computer system 130), the destination analysis unit 108 may send an indication to the fragmentation unit 106 (e.g., in the form of a flag) that the packet is to be fragmented. The destination analysis unit 108 may also determine, and indicate to the fragmentation unit 106, an inter-system MTU associated with the communication network 126.

At stage D2, the fragmentation unit 106 fragments the packet received from the destination analysis unit 108. The fragmentation unit 106 may strip the packet's header, retrieve the data to be transmitted, and fragment the data into two or more blocks of data. The size of the two or more fragmented blocks of data can be less than or equal to the inter-system MTU. The fragmentation unit 106 encapsulates the two or more fragmented blocks of data to generate packets comprising the fragmented blocks of data. The fragmentation unit 106 transmits the packets comprising the fragmented blocks of data to the virtual adapter 11 0. The virtual adapter 110 transmits the packets comprising the fragmented blocks of data to the hypervisor 120.

At stage E2, the hypervisor 120 determines, based on the destination's hardware address, that the destination is the computer system 130, which lies outside the computer system 102. Therefore, the hypervisor 120 transmits the packets comprising the fragmented blocks of data to the virtual I/O server 122. The virtual I/O server 122 is a logical partition that acts as a gateway for all other the other logical partitions in the computer system, handles traffic in and out of the computer system, and comprises resources such as the shared Ethernet adapter (SEA) 124. The SEA 124 enables transfer of data between different computer systems via a physical Ethernet adapter and the communication network 126. The SEA 124 controls the physical Ethernet adapter and enables logical partitions 104 and 112 to communicate with systems outside the computer system 102. The SEA 124 typically receives packets from the logical partitions (via the SEA's virtual adapter) and transmits the packets (via the physical Ethernet adapter) on the physical network. The SEA 124 thus eliminates the need for each client logical partition to have a physical adapter to connect to the external communication network 126. At stage F2, the SEA 124 transmits the packets comprising the fragmented blocks of data along the communication network 126 to the computer system 130.

Figure 2:
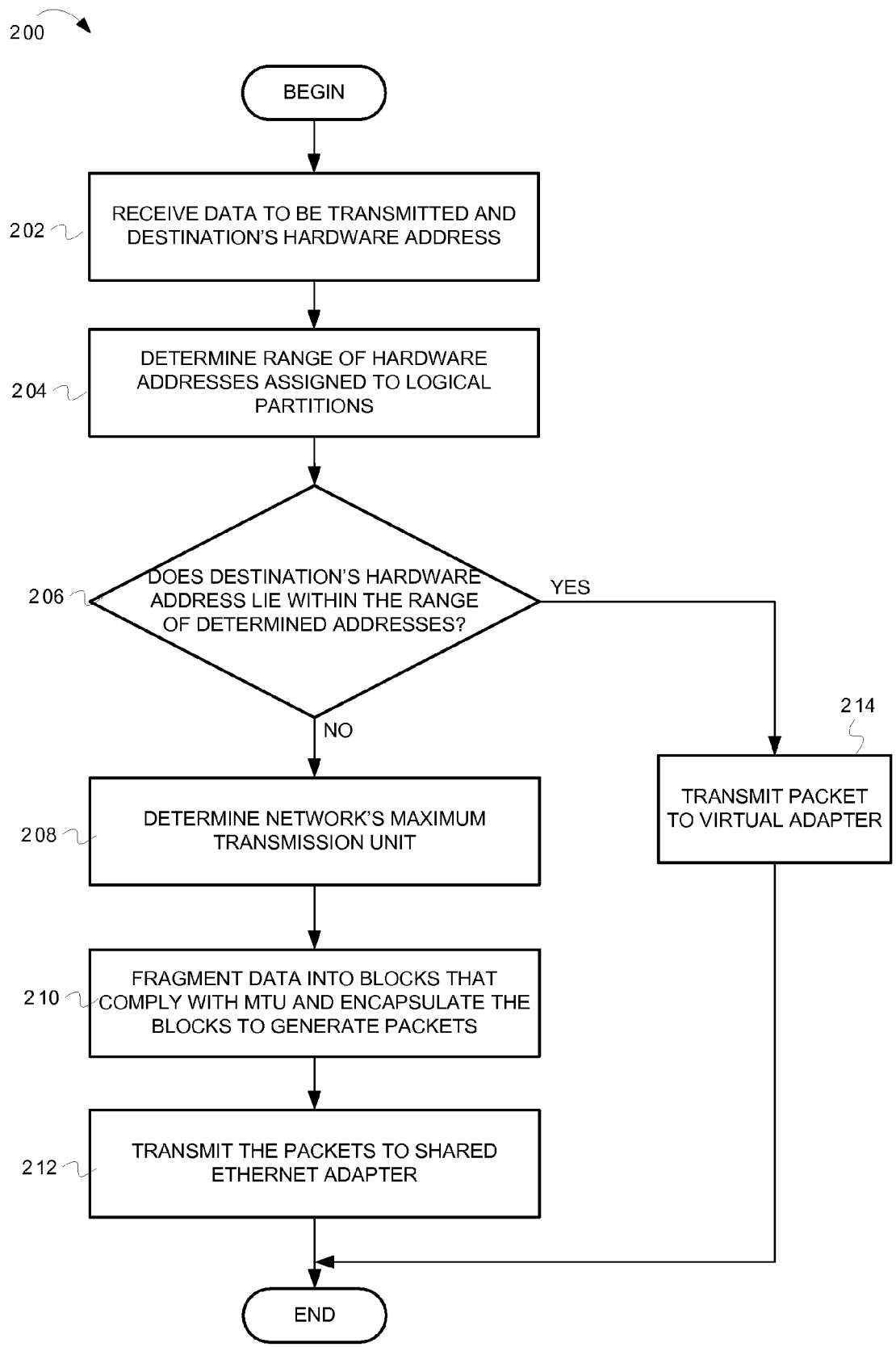
FIG. 2 is a flow diagram illustrating example operations for packet fragmentation in a logical partition.

FIG. 2 is a flow diagram illustrating example operations for packet fragmentation in a logical partition. The flow 200 begins at block 202.

At block 202, data to be transmitted to a destination and the destination's hardware address are received. The data may be a packet, a frame, a block of memory, etc. An application running within a logical partition on a computer system may generate a packet to be transmitted. The packet comprises a payload and a header. The payload comprises data to be transmitted. The header may be analyzed to determine the packet's destination. The flow continues at block 204.

At block 204, a range of hardware addresses, which may be assigned to the logical partitions on the computer system, is determined. Each logical partition in a virtual I/O environment on the computer system is associated with a hardware address that is unique within the computer system. The hardware addresses may be assigned to virtual components (e.g., logical partitions, virtual adapters) or to physical components (e.g., physical adapters on the computer system). When a new virtual component (e.g., logical partition, virtual adapter, etc.) is created using a hardware management console, the hardware management console (HMC) creates a hardware address for the virtual component ("virtual hardware address").

Although the logical component's virtual hardware address is unique within the computer system, it is not globally unique. The virtual hardware address is generated using an algorithm based on the physical computer system's unique serial number. In some instances, the virtual hardware address may be a MAC address. In a MAC address, the $7^{th}$ bit in the first byte in the MAC address is the locally administered bit. If the locally administered bit is set, the device's MAC address is not globally unique indicating a virtual MAC address. A subset of the algorithm used by the HMC can be used, e.g., by the destination analysis unit 108 of FIG. 1, to determine the range of virtual hardware addresses that the virtual components in the VIO environment may have. In some instances, if the computer system's serial number is modified by the user, the logical partition can access the modified serial number (e.g., from the vital product data) and determine the permissible range of virtual hardware addresses. The flow continues at block 206.

At block 206, it is determined whether the destination's address lies within the range of hardware addresses determined at block 204. If the destination address lies within the determined range of addresses, it may be assumed that the destination is a logical partition on the same physical computer system. In some implementations, one or more arithmetic operations, logic operations, and/or bit masking operations may be performed on the destination hardware address to determine whether the packet's source and destination are on the same physical machine. If it is determined that the destination address is one of the addresses within the range of addresses determined at block 204, the flow continues at block 214. Otherwise, the flow continues at block 208.

At block 208, the communication network's maximum transmission unit (MTU) is determined. Packets to be transmitted along the communication network should have a size no larger than the MTU associated with the communication network. The communication network may be governed by standards, which define the maximum size of a packet that may be transmitted along the network (e.g., Ethernet has a default MTU of 1500 bytes). In some instances, the MTU may also be dynamically determined when a point-to-point connection is made between two nodes. The flow continues at block 210.

At block 210, data to be transmitted is fragmented into blocks of length less than or equal to the MTU (determined at block 208). Each logical partition can fragment the data before packets comprising the fragmented data are transmitted to the physical Ethernet adapter and across the physical network. In allowing each logical partition to fragment the outgoing data, the SEA need not fragment the data received from each logical partition, leaving the system. This can help reduce the load on and prevent bottlenecks at the SEA. In some implementations, if a packet is received at block 202, the packet's header may be stripped to retrieve the data to be transmitted. The data may then be fragmented into blocks that comply with the MTU size. The blocks of fragmented data may be encapsulated with a header, wherein the header indicates the destination's address. In one embodiment, after it is determined that the packets are to be transmitted along the physical communication network, the underlying operating system (on the logical partition) may be configured to retrieve data from a socket's send queue in small fragments. The size of the retrieved data fragments may be determined based on the capacity of the physical communication network. The flow continues at block 212.

At block 212, the packets comprising the blocks of fragmented data are transmitted to the Shared Ethernet Adapter (SEA). The SEA acts as a bridge between the physical communication network (e.g., physical Ethernet adapter) and the logical network (e.g., virtual adapters within the logical partitions) and transmits the packets along the physical communication network to the destination. From block 212, the flow ends.

At block 214, the packet is transmitted to the virtual adapter. The flow 200 moves from block 206 to block 214 after it is determined that the destination's hardware address lies within the range of addresses determined at block 204. This can indicate that the destination of the data to be transmitted is another logical partition on the same computer system. An intra-system maximum transmission unit of the virtual adapter is much larger than the MTU of a physical Ethernet adapter and a communication network. For example, the intra-system MTU of the virtual adapter may correspond to the size of the copy buffer in the hypervisor. After it is determined that a data transfer is between local logical partitions, the packet can be virtually transferred without fragmentation, or transferred with fragmentation in accordance with the larger intra-system MTU of the virtual adapter. Data transfer between the two local logical partitions can occur via their respective virtual adapters and the hypervisor. From block 216, the flow ends.

It should be understood that the depicted flow diagram (FIG. 2) is an example meant to aid in understanding embodiments and should not be used to limit embodiments or limit scope of the claims. Embodiments may perform additional operations, fewer operations, operations in a different order, operations in parallel, and some operations differently. For example, instead of receiving the data to be transmitted and the destination hardware address at block 202, a packet may be received. The data to be transmitted may be extracted from the packet's payload, while the destination hardware address may be determined from the packet's header.

Figure 4:
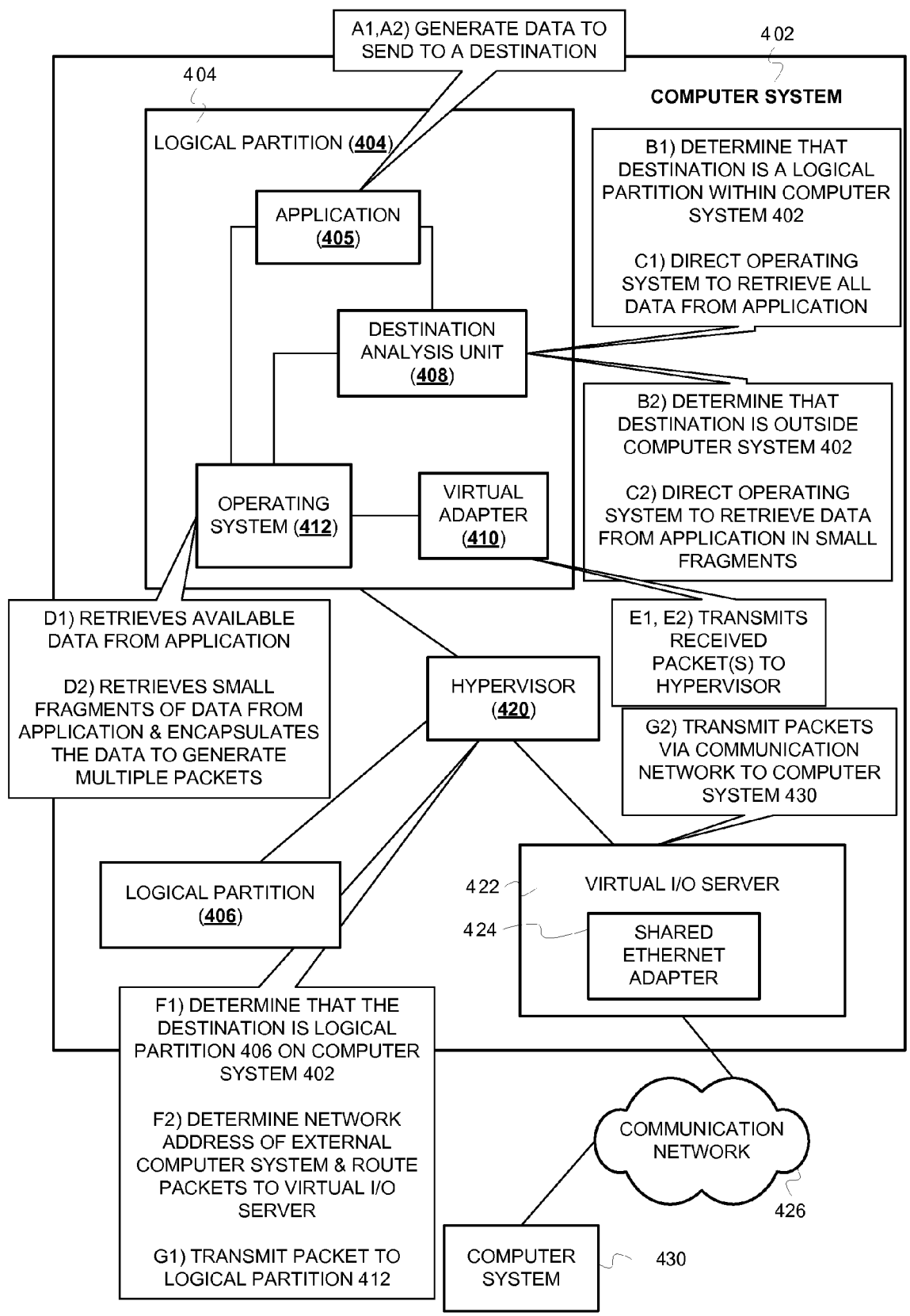
FIG. 4 is an example conceptual diagram illustrating an operating system based data fragmentation mechanism.

Although FIGS. 1-2 describe a fragmentation unit performing operations for fragmentation of data based on the destination address of the data, data fragmentation may be performed by the logical partition's operating system. FIG. 4 describes the logical partition's operating system configured to perform data fragmentation by retrieving fragments of data from a socket send queue.

FIG. 4 is an example conceptual diagram illustrating an operating system based data fragmentation mechanism. FIG. 4 depicts two computer systems—a computer system 402 and a computer system 430. The computer system 402 comprises two logical partitions—a logical partition 404 and a logical partition 406. An application 405 operates within the logical partition 404. The application 405 communicates with a destination analysis unit 408 and an operating system 412. The operating system 412 also communicates with the destination analysis unit 408 and a virtual adapter 410. The logical partitions 404 and 406 are coupled with a hypervisor 420, which in turn is coupled with a virtual I/O server 422. The virtual I/O server 422 comprises a Shared Ethernet Adapter (SEA) 424. The computer system 402 communicates with the computer system 430 via a communication network 426.

At stage A1, the application 405 running within the logical partition 404 generates data to send to a destination. The application 405 can indicate to the destination analysis unit 408, an address (e.g., MAC addresses) associated with the data's destination. At stage B 1, the destination analysis unit 408 determines a range of addresses that can be assigned to the logical partitions on the computer system 402, and determines whether the data's destination address is one of the addresses within the determined range of addresses. As described earlier, the range of addresses may be determined by means of an algorithm that uses the computer system's serial number.

In the example of FIG. 4, the logical partition 406 is the data's destination. The destination analysis unit 408 determines that the data's destination is on the computer system 402. Therefore, at stage C 1, the destination analysis unit 408 directs the operating system 412 to retrieve all the data from generated by the application 405 for transmission.

The application 405 opens a socket. A socket can be an end-point of a bidirectional communication flow across a network (e.g., the Internet). Each socket may be associated with an application process or thread. In other words, a socket can be an interface between an application's process or thread and an operating system (e.g., TCP/IP protocol stack provided by the operating system). The application 405 places the data to be transmitted on the socket.

At stage D1, the operating system (O.S.) 412 retrieves the data from the socket associated with the application 405, encapsulates the data to generate a packet, and transmits the packet to the virtual adapter 410. The operating system may set a flag in the encapsulation to indicate that the destination of the data contained in the packet may be a logical partition on the computer system 402. In some implementations, the operating system may retrieve blocks of data in accordance with an intra-system MTU. The intra-system MTU may indicate a maximum data size for transmission between logical partitions within the same computer system. For example, the intra-system MTU may correspond to a transmission buffer size of the second logical partition. At stage E1, the virtual adapter 410 transmits the packet to the hypervisor 420.

At stage F1, the hypervisor 420 determines that the packet should be transmitted to logical partition 406 on the computer system 402. At stage G1, the hypervisor 420 transmits the packet to the logical partition 406.

At stage A2, the application 405 running within the logical partition 404 generates data to send to a destination. At stage B2, the destination analysis unit 408 determines a range of addresses that can be assigned to logical partitions on the computer system 402 and determines whether the data's destination address is one of the addresses within the determined range of addresses. At stage B2, the destination analysis unit 408 also determines that the data's destination does not lie within the determined range of addresses. Therefore, the destination analysis unit 408 determines that the packet's destination lies outside the computer system 402.

At stage C2, the destination analysis unit 408 directs the operating system 412 to retrieve data from the application in small fragments. The size of the retrieved data fragments is determined based on a maximum transmission unit (MTU) associated with the communication network 426.

At stage D2, the operating system (O.S.) 412 retrieves one or more fragments of data from a send queue in a socket associated with the application 405. The size of the data fragments, retrieved by the O.S, may be determined based on the capacity of the physical communication network. The O.S 412 encapsulates the one or more fragments of data (e.g., applies a TCP/IP header) to generate one or more packets, and transmits the one or more packets to the virtual adapter 410. The operating system 412 may set a flag in the encapsulation to indicate that the destination of the data contained in the one or more packets may lie outside the computer system 402. At stage E2, the virtual adapter 410 transmits the packets to the hypervisor 420.

At stage F2, the hypervisor 420 determines that the packets should be transmitted to the computer system 430. Therefore, the hypervisor 420 transmits the one or more packets to the virtual I/O server 422. At stage G2, the shared Ethernet adapter 424 in the virtual I/O server 422 transmits the one or more packets along the communication channel 426 to the computer system 430.

Figure 3:
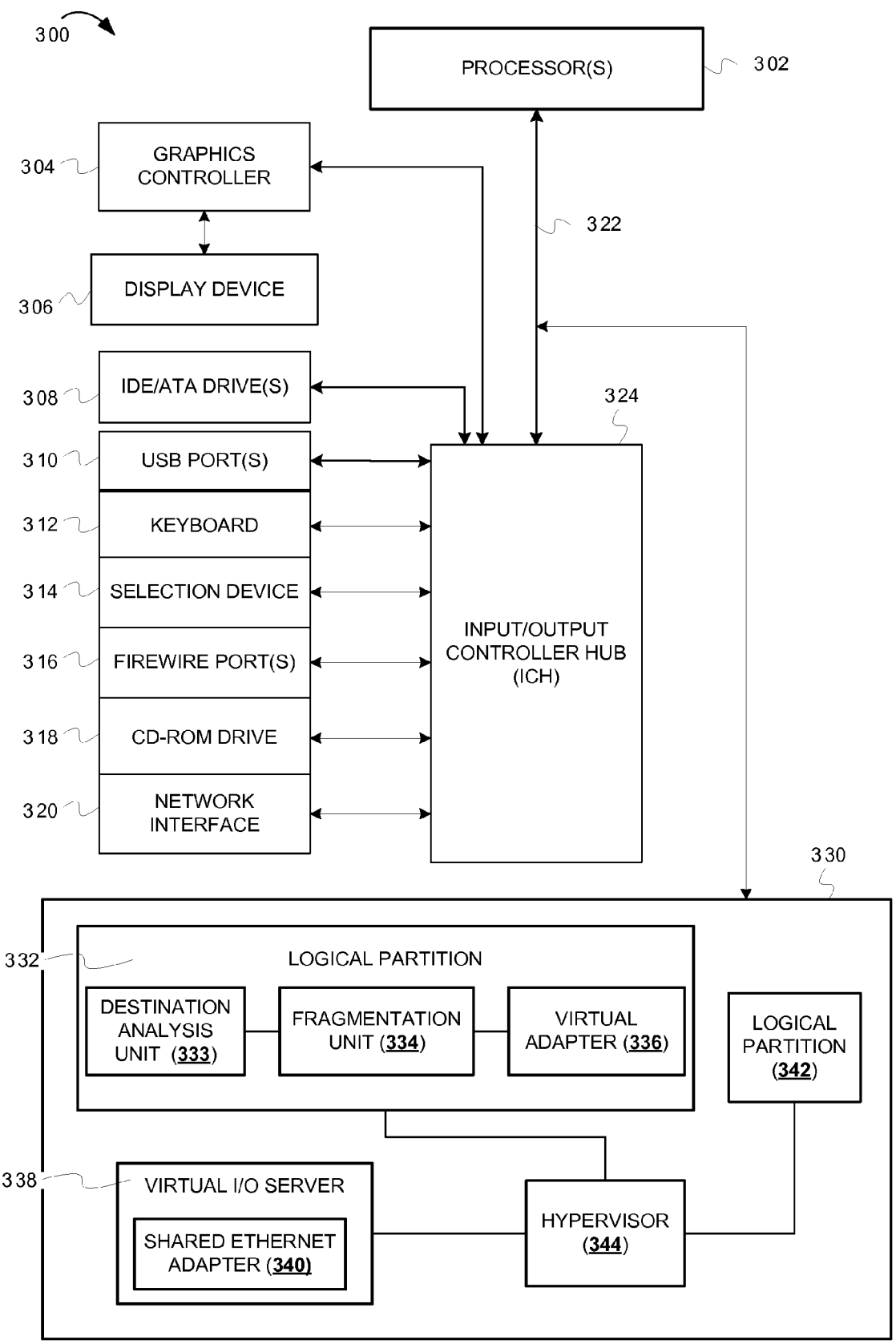
FIG. 3 is an example block diagram illustrating a computer system configured to fragment a packet based on the packet's destination address.

FIG. 3 is an example computer system configured to fragment a packet based on the packet's destination address. The computer system 300 includes a processor 302. The processor 302 is connected to an input/output controller hub 324 (ICH), also known as a south bridge, via a bus 322 (e.g., PCI, ISA, PCI-Express, HyperTransport, etc). A memory unit 330 interfaces with the processor 302 and the ICH 324. The main memory unit 330 can include any suitable random access memory (RAM), such as static RAM, dynamic RAM, synchronous dynamic RAM, extended data output RAM, etc.

In one embodiment, the memory unit 330 embodies functionality for fragmenting packets in a logical partition. The memory unit 330 depicts a virtual I/O environment and comprises a logical partition 332 coupled with a hypervisor 344. The memory unit 330 also comprises a logical partition 342 coupled with the hypervisor 344. The hypervisor is coupled with a virtual I/O server 338. The virtual I/O server 338 comprises a Shared Ethernet Adapter 338. The logical partition 332 comprises a fragmentation unit 334 coupled with a destination analysis unit 333 and a virtual adapter 336.

The virtual I/O environment allows the logical partition 332 and the logical partition 342 to communicate with each other via the hypervisor 344. Likewise, the logical partitions can communication with external nodes (e.g., logical partitions on other computers systems) via the shared Ethernet adapter (340).

The destination analysis unit 333 determines a range of addresses that can be assigned to the logical partition 332 on computer system 300. The destination analysis unit 333 also determines whether the packet's destination address is one of the addresses within the determined range of addresses. If the destination analysis unit 333 determines that the packet's destination is another logical partition on the computer system, the destination analysis unit 333 transmits the packet, to the fragmentation unit 334 and indicates (e.g., by setting a flag in the packet's header) that the packet should not be transmitted. The fragmentation unit 334 may transmit the packet, without fragmentation, to the virtual adapter 336. If the size of the packet is larger than an intra-system MTU, the fragmentation unit 334 may fragment data in the packet in accordance with the intra-system MTU. The virtual adapter 336 transmits the packets to the hypervisor 340. The hypervisor 340 determines that the packets should be transmitted to a logical partition residing on the same computer system, e.g., logical partition 2 (342), and transmits the packets to logical partition 2 (342).

Alternately, if the destination analysis unit 333 determines that the packet's destination resides on a different computer system, the destination analysis unit 333 transmits the packet to the fragmentation unit 334. The fragmentation unit 334 fragments the packet, creating smaller packets based on the maximum transmission unit (MTU) size. The fragmentation unit 334 transmits the smaller fragmented packets to the virtual adapter 336, which in turn transmits the fragmented packets to the hypervisor 344. The hypervisor 344 determines that the destination is outside the computer system and transmits the fragmented packets to the virtual I/O server 338. The SEA 340 transmits the fragmented packets via the external communication network and a physical Ethernet adapter. In some implementations, an operating system associated with the logical partition can be configured to retrieve fragments of data from a socket send queue. The size of the data fragments retrieved by the operating system is less than or equal to the MTU associated with the communication network.

The ICH 324 connects and controls peripheral devices. In FIG. 3, the ICH 324 is connected to IDE/ATA drives 308 (used to connect external storage devices) and to universal serial bus (USB) ports 310. The ICH 324 may also be connected to a keyboard 312, a selection device 314, firewire ports 316 (for use with video equipment), CD-ROM drive 318, and a network interface 320. The ICH 324 can also be connected to a graphics controller 304. The graphics controller is connected to a display device (e.g., monitor). In some embodiments, the computer system 300 can include additional devices and/or more than one of each component shown in FIG. 3 (e.g., video cards, audio cards, peripheral devices, etc.). For example, in some instances, the computer system 300 may include multiple processors, multiple cores, multiple external CPU's. In other instances, components may be integrated or subdivided.

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium that can include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for discriminatory MTU fragmentation in a logical partition as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving an address of a destination and data to be transmitted to the destination, wherein the data to be transmitted is generated by an application on a first logical partition on a first computer system;
determining a range of addresses that may be assigned to logical partitions on the first computer system;
determining that the destination address is assigned to a second logical partition on the first computer system based on the destination address falling within the range of addresses;
transmitting the data to the second logical partition without fragmenting responsive to said determining that the destination address is assigned to the second logical partition on the first computer system;
receiving a second address of a second destination and second data to be transmitted to the second destination, wherein the second data to be transmitted is generated by the application on the first logical partition on the first computer system;
determining that the second destination address is outside the determined range of addresses;
determining an inter-system maximum transmission unit associated with a communication protocol, wherein the second data is to be transmitted to the second destination in accordance with the communication protocol;
fragmenting the second data into a plurality of data blocks based, at least in part, on the inter-system maximum transmission unit;
encapsulating each of the plurality of data blocks in accordance with the communication protocol to generate a plurality of encapsulated blocks;
transmitting, by a virtual adapter of the first logical partition, the plurality of encapsulated blocks to a hypervisor of the first computer system;
determining, by the hypervisor, that each of the plurality of encapsulated blocks does not indicate that the encapsulated block is being transmitted between logical partitions of the first computer system;
transmitting the plurality of encapsulated blocks to a virtual input/output server of the first computing system responsive to said determining that each of the plurality of encapsulated blocks does not indicate that the encapsulated block is being transmitted between logical partitions of the first computer system; and
the virtual input/output server transmitting, via a shared Ethernet adapter, each of the plurality of encapsulated blocks to the second destination, wherein the second destination comprises one of a logical partition on a second computer system and a second computer system.

2. The method of claim 1, further comprising:
encapsulating the data with a header that indicates destination address and that indicates that the data is being transmitted between logical partitions within the first computer system;
a virtual adapter of the first logical partition transmitting the encapsulated data to a hypervisor of the first computer system; and
determining, by the hypervisor, that the data is being transmitted between logical partitions within the first computer system based, at least in part, on the header, wherein said transmitting the data to the second logical partition without fragmenting is by the hypervisor.

3. The method of claim 1, wherein said receiving the address of the destination and the data to be transmitted to the destination further comprises:

receiving a packet to be transmitted, wherein the packet comprises a header and a payload and wherein the packet is generated by the application on the first logical partition on the computer system;

stripping the header from the packet to retrieve the payload, wherein the payload comprises the data to be transmitted; and determining, from the header, the address of the destination.

4. A program product for discriminatory data transmission fragmentation, the computer program product comprising:

a non-transitory computer readable storage medium having computer readable program code embodied therewith, the computer readable program code configured to receive an address of a destination and data to be transmitted to the destination, wherein the data to be transmitted is generated by an application on a first logical partition on a first computer system;

determine a range of addresses that may be assigned to logical partitions on the first computer system;

determine that the destination address is assigned to a second logical partition on the first computer system based on the destination address falling within the range of addresses;

transmit the data to the second logical partition without fragmenting responsive to an executing instance of the computer readable program code determining that the destination address is assigned to the second logical partition on the first computer system;

receive a second address of a second destination and second data to be transmitted to the second destination, wherein the second data to be transmitted is generated by the application on the first logical partition on the first computer system;

determine that the second destination address is outside the determined range of addresses;

determine an inter-system maximum transmission unit associated with a communication protocol, wherein the second data is to be transmitted to the second destination in accordance with the communication protocol;

fragment the second data into a plurality of data blocks based, at least in part, on the inter-system maximum transmission unit;

encapsulate each of the plurality of data blocks in accordance with the communication protocol to generate a plurality of encapsulated blocks;

transmit the plurality of encapsulated blocks to a hypervisor of the first computer system, wherein the computer readable program code comprises hypervisor program code;

the hypervisor program code configured to determine that each of the plurality of encapsulated blocks does not indicate that the encapsulated block is being transmitted between logical partitions of the first computer system; and transmit the plurality of encapsulated blocks to a virtual input/output server of the first computing system, wherein the virtual input/output server, via a shared Ethernet adapter, transmits each of the plurality of encapsulated blocks to the second destination, wherein the second destination comprises one of a logical partition on a second computer system, and a second computer system.

5. The computer program product of claim 4, wherein the computer readable program code is further configured to:

encapsulate the data with a header that indicates the destination address and that indicates that the data is being transmitted between logical partitions within the first computer system;

transmit the encapsulated data to a hypervisor of the first computer system;

wherein the computer readable program code comprises hypervisor program code configured to determine that the data is being transmitted between logical partitions within the first computer system based, at least in part, on the header, wherein the computer readable program code configured to transmit the data to the second logical partition without fragmenting comprises the hypervisor program code.

* * * * *